(12) United States Patent
Kawaguchi

(10) Patent No.: US 10,991,171 B2
(45) Date of Patent: Apr. 27, 2021

(54) INFORMATION PROCESSING DEVICE AND INFORMATION PROCESSING METHOD

(71) Applicant: TOYOTA JIDOSHA KABUSHIKI KAISHA, Toyota (JP)

(72) Inventor: Keizoh Kawaguchi, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/538,892

(22) Filed: Aug. 13, 2019

(65) Prior Publication Data

US 2020/0134936 A1    Apr. 30, 2020

(30) Foreign Application Priority Data

Oct. 24, 2018    (JP) .............................. JP2018-200397

(51) Int. Cl.
| | | |
|---|---|---|
| *B60Q 1/00* | (2006.01) | |
| *G07C 5/00* | (2006.01) | |
| *H04R 1/40* | (2006.01) | |
| *H04R 3/00* | (2006.01) | |
| *G08B 25/10* | (2006.01) | |
| *G07C 5/12* | (2006.01) | |
| *H04W 4/90* | (2018.01) | |

(52) U.S. Cl.
CPC .............. *G07C 5/008* (2013.01); *G07C 5/12* (2013.01); *G08B 25/10* (2013.01); *H04R 1/406* (2013.01); *H04R 3/005* (2013.01); *H04W 4/90* (2018.02); *H04R 2499/13* (2013.01)

(58) Field of Classification Search
CPC .......... G07C 5/008; G07C 5/12; H04W 4/90; G08B 25/10; H04R 1/406; H04R 3/005; H04R 2499/13
USPC ......................................................... 340/436
See application file for complete search history.

(56) References Cited

U.S. PATENT DOCUMENTS

| | | | | |
|---|---|---|---|---|
| 2007/0102527 | A1* | 5/2007 | Eubank | .................. H04M 11/04 235/492 |
| 2007/0159309 | A1* | 7/2007 | Ito | .......................... G16H 10/20 340/425.5 |
| 2008/0118080 | A1* | 5/2008 | Gratke | ................ B60R 16/0373 381/86 |
| 2009/0129607 | A1* | 5/2009 | Yamamoto | ............... H04R 3/02 381/86 |
| 2009/0292528 | A1* | 11/2009 | Kameyama | ............. G10L 13/00 704/9 |
| 2013/0267194 | A1* | 10/2013 | Breed | ..................... G08G 1/205 455/404.2 |

(Continued)

FOREIGN PATENT DOCUMENTS

| | | |
|---|---|---|
| CN | 101437064 A | 5/2009 |
| CN | 104065798 A | 9/2014 |

(Continued)

*Primary Examiner* — Zhen Y Wu
(74) *Attorney, Agent, or Firm* — Oblon, McClelland, Maier & Neustadt, L.L.P.

(57) ABSTRACT

In an information processing device, an acquisition unit acquires information on a position of an occupant from a vehicle that is in an accident. A reception unit receives a manipulation input from an operator. A determination unit determines directivity of a microphone in a vehicle cabin of the vehicle based on the manipulation input received by the reception unit.

3 Claims, 2 Drawing Sheets

(56) References Cited

U.S. PATENT DOCUMENTS

| | | | | |
|---|---|---|---|---|
| 2014/0097957 A1* | 4/2014 | Breed | ............... | G08B 21/0407 340/576 |
| 2014/0300739 A1* | 10/2014 | Mimar | .................. | G08B 21/06 348/148 |
| 2015/0078632 A1* | 3/2015 | Hachisuka | ........ | G06K 9/00832 382/118 |
| 2016/0029111 A1* | 1/2016 | Wacquant | .............. | H04R 3/005 381/71.4 |
| 2017/0317706 A1* | 11/2017 | Kudo | ...................... | H04W 4/02 |
| 2018/0295443 A1* | 10/2018 | Takada | ..................... | B60N 2/80 |
| 2019/0023129 A1* | 1/2019 | Huger | .................. | B60W 50/08 |
| 2019/0069080 A1* | 2/2019 | Abrams | ................. | G06F 3/165 |

FOREIGN PATENT DOCUMENTS

| | | |
|---|---|---|
| CN | 108701318 A | 10/2018 |
| JP | 2016-30481 A | 3/2016 |

* cited by examiner

INFORMATION PROCESSING DEVICE AND INFORMATION PROCESSING METHOD

INCORPORATION BY REFERENCE

The disclosure of Japanese Patent Application No. 2018-200397 filed on Oct. 24, 2018 including the specification, drawings and abstract is incorporated herein by reference in its entirety.

BACKGROUND

1. Technical Field

The present disclosure relates to an information processing device and an information processing method for acquiring information on a vehicle that is in an accident.

2. Description of Related Art

A system in which, when a collision accident has occurred in a vehicle, an emergency notification is automatically executed from an emergency notification device mounted in the vehicle to a management center, and an ambulance or the like is caused to be directed to an accident site by arrangement of the management center has been known.

Japanese Unexamined Patent Application Publication No. 2016-30481 (JP 2016-30481 A) discloses a vehicular emergency notification device capable of estimating a degree of injury of an occupant on the management center side when a vehicle accident occurs. In this device, microphones are provided near seats of the vehicle one by one, a voice of the occupant is acquired by the microphone, and voice information is transmitted to the management center. An operator of the management center ascertains, for example, a situation of injury by talking with the occupant.

SUMMARY

In a technology of JP 2016-30481 A, for example, clear acquisition of a voice of a specific occupant is likely to be difficult in a situation in which noise outside an accident vehicle is great.

The present disclosure has been made in view of such circumstances, and the present disclosure provides an information processing device and an information processing method capable of facilitating clear acquisition of a voice of an occupant at a designated position in a vehicle cabin when an accident has occurred in a vehicle.

A first aspect of the present disclosure relates to an information processing device. The information processing device includes an acquisition unit configured to acquire information on a position of an occupant from a vehicle that is in an accident; a reception unit configured to receive a manipulation input from an operator; and a determination unit configured to determine directivity of a microphone in a vehicle cabin of the vehicle based on the manipulation input.

According to the first aspect, since the directivity of the microphone in the vehicle cabin of the vehicle that is in the accident is determined based on the manipulation input of the operator, it is possible to facilitate clear acquisition of the voice of the occupant at the designated position.

In the information processing device according to the first aspect, the acquisition unit may acquire information on the occupant from the vehicle, and the information processing device may include a display unit that displays an image representing a seating position of the occupant and a state of the occupant based on the information on the occupant.

In the information processing device according to the first aspect, the reception unit may receive a manipulation input for designating the seating position of the occupant in the image displayed on the display unit, and the determination unit may determine the directivity of the microphone to be a direction of the designated seating position of the occupant.

In the information processing device according to the first aspect, the acquisition unit may acquire information on an open and closed state of a window from the vehicle, and the display unit may display an image representing the open and closed state of the window.

In the information processing device according to the first aspect, the determination unit may determine the directivity of the microphone to be a direction of a designated window based on a manipulation input for designating the window in the image displayed on the display unit.

A second aspect of the present disclosure also relates to an information processing device. The information processing device includes an acquisition unit configured to acquire information on an occupant from a vehicle that is in an accident; and a display unit configured to display an image representing a seating position of the occupant and a state of the occupant based on the information on the occupant.

According to the second aspect, it is possible to rapidly ascertain the seating position and the state of each occupant of the vehicle that is in the accident based on the image.

A third aspect of the present disclosure relates to an information processing method. The information processing method includes an acquisition step of acquiring information on a position of an occupant from a vehicle that is in an accident; a reception step of receiving a manipulation input from an operator; and a determination step of determining directivity of a microphone in a vehicle cabin of the vehicle based on the manipulation input received in the reception step.

According to the aspects of the present disclosure, it is possible to facilitate clear acquisition of a voice of an occupant at a designated position in a vehicle cabin when an accident has occurred in a vehicle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
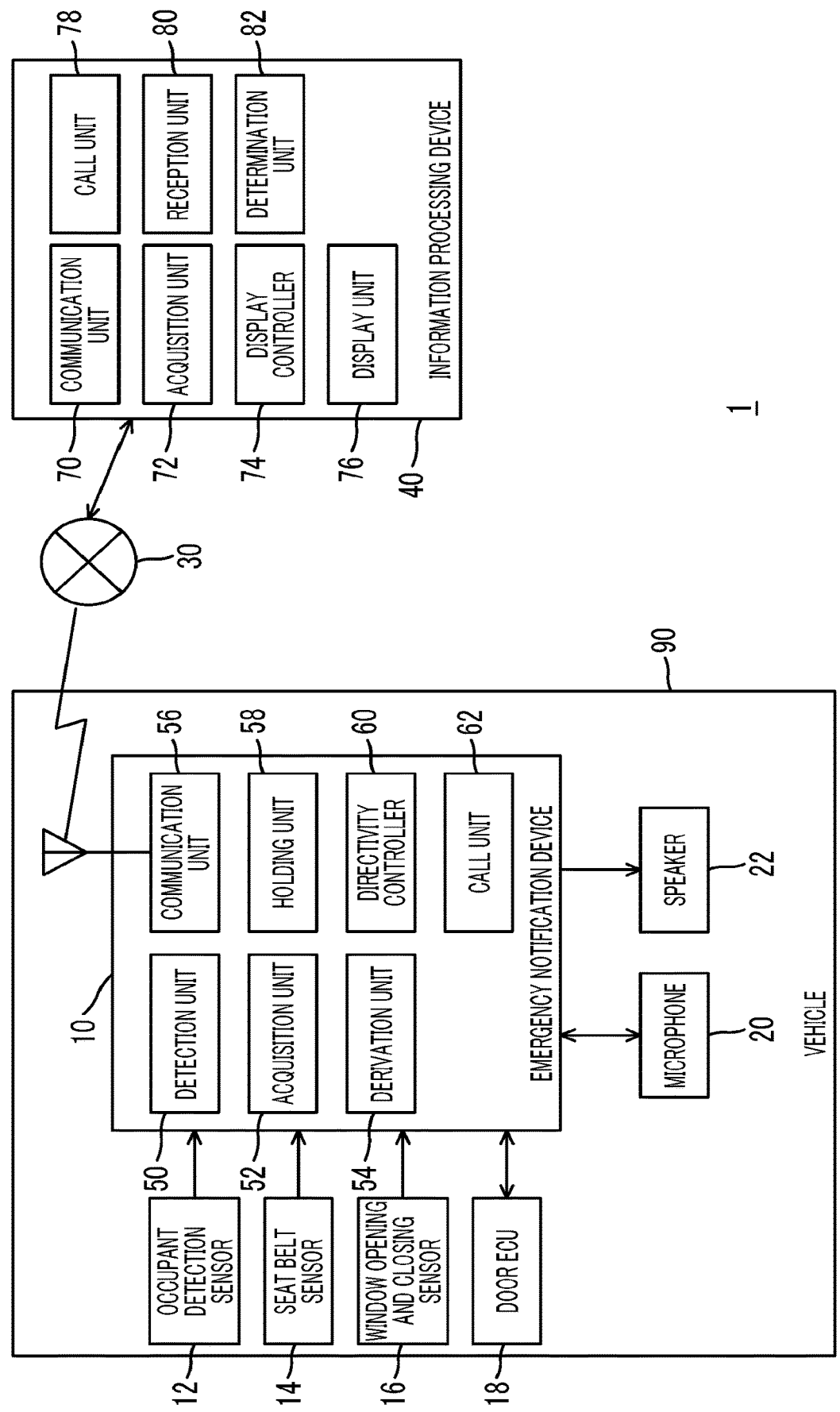
FIG. 1 is a block diagram illustrating a configuration of an emergency call system according to an embodiment.

FIG. 1 is a block diagram illustrating a configuration of an emergency notification system 1 according to an embodiment. The emergency notification system 1 includes an emergency notification device 10 and an information processing device 40.

The emergency notification device 10 is mounted in a vehicle 90 that is a car. The emergency notification device 10 has a wireless communication function, and is connected to a network 30 via a wireless base station or a wireless access point. An information processing device 40 is connected to the network 30, and the information processing device 40 communicates with the emergency notification device 10 via the network 30. The information processing device 40 is installed, for example, at an emergency notification center and used by an operator. A standard of the wireless communication is not particularly limited, and includes, for example, 3G (a third generation mobile communication system), 4G (a fourth generation mobile communication system), or 5G (a fifth generation mobile communication system).

The vehicle 90 includes an emergency notification device 10, an occupant detection sensor 12, a seat belt sensor 14, a window opening and closing sensor 16, a door ECU 18, a microphone 20, and a speaker 22. The emergency notification device 10 includes a detection unit 50, an acquisition unit 52, a derivation unit 54, a communication unit 56, a holding unit 58, a directivity controller 60, and a call unit 62.

The occupant detection sensor 12 is provided at each seat of the vehicle 90, detects a load on a seat to detect a seating state of the occupant on each seat, and outputs a detection result to the acquisition unit 52.

The seat belt sensor 14 is provided in each seat of the vehicle 90, detects a wearing state of the seat belt of the occupant on each seat, and outputs a detection result to the acquisition unit 52.

The window opening and closing sensor 16 detects an open and closed state of each window of the vehicle 90, and outputs a detection result to the door ECU 18 and the acquisition unit 52.

When an acceleration sensor (not illustrated) detects an acceleration equal to or greater than a predetermined threshold value due to, for example, a collision of the vehicle 90, an airbag electronic control unit (ECU) (not illustrated) outputs a deployment signal for deploying an airbag to the airbag and the detection unit 50. When the detection unit 50 receives the deployment signal, the detection unit 50 detects that an accident has occurred in the vehicle 90.

When the occurrence of the accident is detected by the detection unit 50, the door ECU 18 diagnoses whether or not there is a possibility that the window is broken with respect to the respective windows of which a closed state has been detected by the window opening and closing sensor 16. The door ECU 18 sets a jam protection function to be effective, closes the window, and executes the diagnosis. The jam protection is a function of executing a window opening operation when a load is applied to a motor for opening and closing a window during a window closing operation to prevent pinching of a hand or the like. Normally, the jam protection function is disabled when the window is substantially completely closed, but is enabled for diagnosis. When the window is not broken, it is assumed that a load is applied to the motor through an operation of closing a window that has already been closed and the jam protection works. When the window is broken, it is assumed that no load is applied to the motor through an operation of closing the window and the jam protection does not work. The door ECU 18 detects that the window is in an open state when the jam protection does not work in the window in which the window opening and closing sensor 16 indicates a closed state, and outputs a detection result to the acquisition unit 52.

The acquisition unit 52 regularly acquires the detection result of the occupant detection sensor 12 and the detection result of the seat belt sensor 14 regardless of the presence or absence of an accident occurrence detection. When occurrence of an accident is detected by the detection unit 50, the acquisition unit 52 outputs the detection result of the occupant detection sensor 12 and the detection result of the seat belt sensor 14 acquired immediately before the occurrence of the accident to the derivation unit 54.

When the occurrence of the accident is detected by the detection unit 50, the acquisition unit 52 acquires the detection result of the open and closed state of the window output from at least one of the door ECU 18 or the window opening and closing sensor 16, and outputs the acquired detection result to the derivation unit 54. As described above, in the window in which the detection result of the window opening and closing sensor 16 indicates a closed state, the window is considered to be open when the detection result of the door ECU 18 indicates an open state.

When the detection unit 50 detects occurrence of an accident, the derivation unit 54 derives the emergency notification information and outputs the derived emergency notification information to the communication unit 56. The emergency notification information is also referred to as minimum set of data (MSD). The emergency notification information includes information for specifying the vehicle 90, the position of the vehicle 90, the detection result of the occupant detection sensor 12, the detection result of the seat belt sensor 14, and the detection result of the open and closed state of the window, which are output from the acquisition unit 52. The information for specifying the vehicle 90 includes a vehicle identification number (VIN), information on a license plate, a vehicle type, a color of the vehicle 90, and the like, and is stored in a storage unit (not illustrated) in advance. The position of the vehicle 90 is acquired by a GPS receiver (not illustrated).

The communication unit 56 transmits the emergency notification information output from the derivation unit 54 to the information processing device 40.

Figure 2:
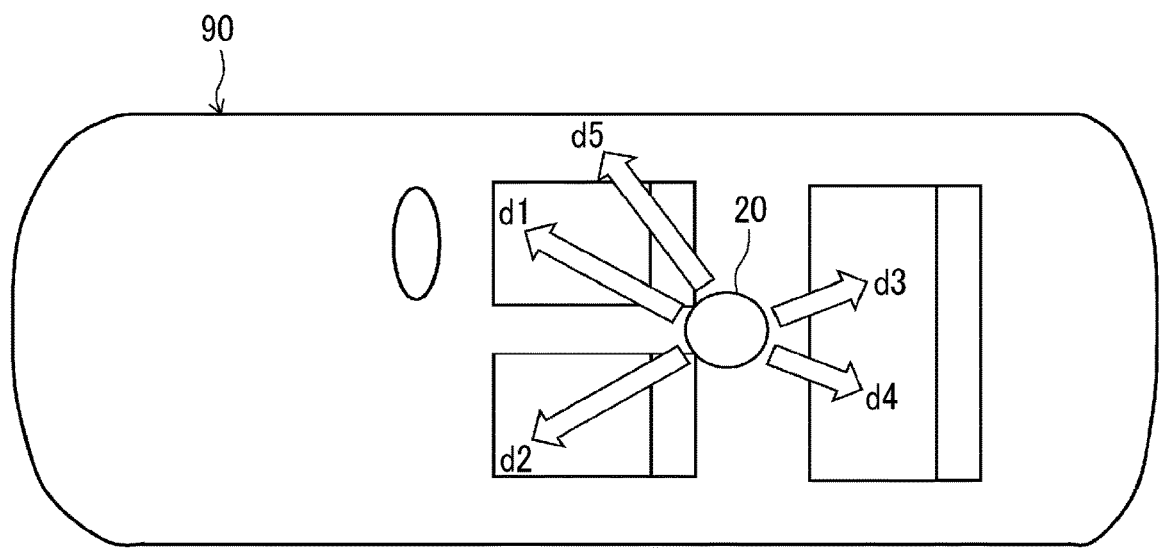
FIG. 2 is a diagram schematically illustrating a vehicle cabin of a vehicle in FIG. 1.

FIG. 2 schematically illustrates a vehicle cabin of the vehicle 90 in FIG. 1. One microphone 20 is provided, for example, near a center of the vehicle cabin. The microphone 20 is unidirectional, and a sensitivity in a specific direction is higher than a sensitivity in other directions. In a normal time other than the time of occurrence of an accident, the directivity of the microphone 20 is set to a direction d1 of a driver's seat so that it is easy to acquire driver's speech. In the normal time, information on voice acquired by the microphone is supplied to a navigation device (not illustrated) or the like, and the navigation device or the like can be manipulated through voice recognition. The direction of the directivity of the microphone can be changed under the control of the directivity controller 60. The directivity of the microphone 20 can be changed to, for example, a direction d2 of a passenger seat, a direction d3 of a right rear seat, a direction d4 of a left rear seat, a direction d5 of the window on the driver's seat side, and the like.

Return to FIG. 1. The holding unit 58 holds control information for the directivity of the microphone 20 regarding each seat and each window in advance. The directivity control information includes, for example, an angle for setting the directivity in a direction of each seat and each window.

The directivity controller 60 controls the directivity of the microphone 20 based on directivity information of the microphone 20 transmitted from the information processing device 40 to be described below at the time of occurrence of an accident and control information for the directivity held in the holding unit 58. For example, when the designated directivity is a direction of the right rear seat, the directivity controller 60 controls the directivity based on the control information for the directivity on the right rear seat.

Voice information acquired by the microphone 20 is also supplied to the call unit 62. When the occurrence of the accident is detected, the call unit 62 is connected to the call unit 78 of the information processing device 40 via the communication unit 56, and executes a call between the occupant of the vehicle 90 and the operator of the information processing device 40 using the microphone 20 and the speaker 22. The speaker 22 is provided in the vehicle cabin and outputs a voice based on a voice signal supplied from the call unit 62.

The information processing device 40 includes a communication unit 70, an acquisition unit 72, a display controller 74, a display unit 76, a call unit 78, a reception unit 80, and a determination unit 82. The communication unit 70 receives the emergency notification information from the vehicle that is in the accident, and outputs the received emergency notification information to the acquisition unit 72.

The acquisition unit 72 acquires the emergency notification information output from the communication unit 70, and acquires information on the occupant of the accident vehicle based on the emergency notification information.

The acquisition unit 72 acquires information on the position of the occupant based on the detection result of the occupant detection sensor 12 in the emergency notification information.

The acquisition unit 72 acquires information on the state of the occupant based on the detection result of the occupant detection sensor 12 and the detection result of the seat belt sensor 14 in the emergency notification information. The acquisition unit 72 acquires information on the state of the occupant indicating that a degree of serious injury of the occupant is low when the occupant is seated on a certain seat and the seat belt is worn. The acquisition unit 72 acquires information on the state of the occupant indicating that the degree of serious injury of the occupant is high when the occupant is seated on the certain seat and the seat belt is not worn.

The acquisition unit 72 acquires information on the open and closed state of the window based on the detection result of the open and closed state of the window in the emergency notification information. The acquisition unit 72 outputs the acquired information on the occupant and the acquired information on the open and closed state of the window to the display controller 74.

The display controller 74 controls the display of the image in the display unit 76 based on the information on the occupant and the information on the open and closed state of the window, which are output from the acquisition unit 72.

Under the control of the display controller 74, the display unit 76 displays an image illustrating the seating position of the occupant in the accident vehicle, the state of the occupant, and the open and closed state of the window.

Figure 3:
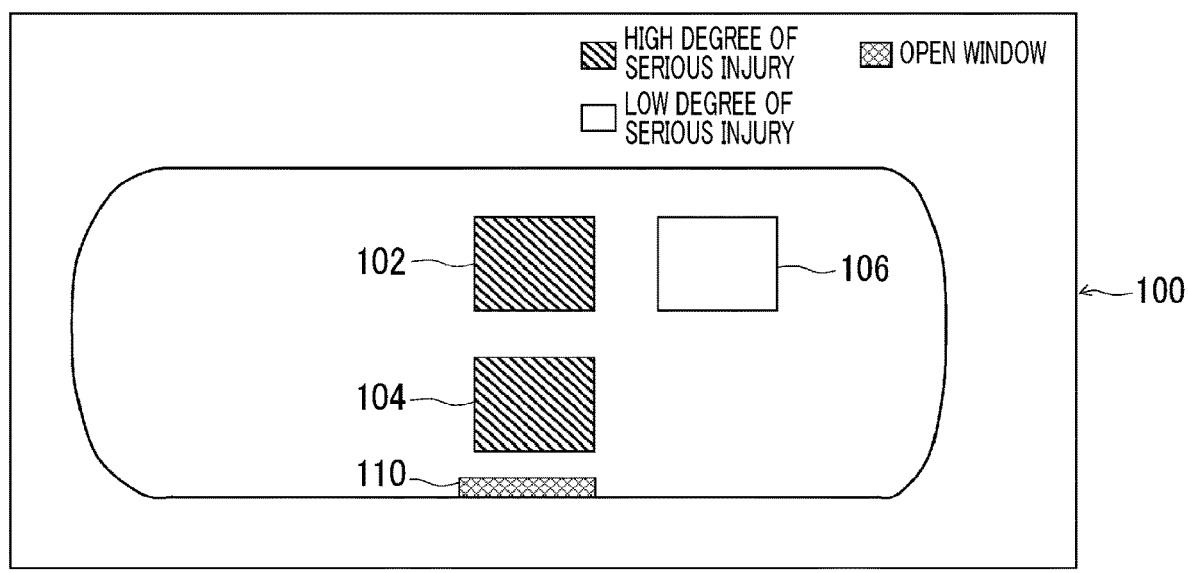
FIG. 3 is a diagram illustrating an example of an image displayed on a display unit of an information processing device in FIG. 1.

FIG. 3 illustrates an example of an image 100 displayed on the display unit 76 of the information processing device 40. The image 100 includes a FIG. 102 indicating an occupant of which a seating position is a driver's seat, a FIG. 104 indicating an occupant of which a seating position is a passenger seat, and a FIG. 106 indicating an occupant of which a seating position is a right rear seat. Since no figure is displayed in a position corresponding to the left rear seat, this indicates that no occupant is seated at the left rear seat. Instead of the figures, characters indicating occupants may be displayed.

Each of the FIGS. 102, 104, and 106 also indicates a state of the occupant using color or a pattern. The FIG. 102 indicates that a state of the occupant at the driver's seat is "a high degree of serious injury". The FIG. 104 indicates that the state of the passenger at the passenger seat is "a high degree of serious injury". The FIG. 106 indicates that the state of the occupant at the right rear seat is "a low degree of serious injury".

The image 100 also includes a FIG. 110 indicating that a window on the passenger seat side is in an open state. Since no figures are displayed in positions corresponding to other windows, the image 100 indicates that the other windows are in a closed state.

Return to FIG. 1. When the acquisition unit 72 acquires the emergency notification information, the call unit 78 executes a call between the occupant of the vehicle 90 and the operator via the call unit 62 of the emergency notification device 10 that has transmitted the emergency notification information.

The reception unit 80 receives a manipulation input of an operator for designating the seating position of the occupant or the position of the window in the open state in the image displayed on the display unit 76. The reception unit 80 may include a touch sensor that receives a touch manipulation input on a screen of the display unit 76 by the operator.

The determination unit 82 determines the directivity of the microphone 20 in the vehicle cabin of the vehicle 90 based on the manipulation input. The determination unit 82 determines the directivity of the microphone 20 in the direction of the designated seating position of the occupant based on the manipulation input for designating the seating position of the occupant in the image displayed on the display unit 76. The determination unit 82 determines the directivity of the microphone 20 in the direction of the designated window based on the manipulation input for designating the window in the image displayed on the display unit 76.

The determination unit 82 outputs information on the determined directivity of the microphone 20 to the communication unit 70, and the communication unit 70 transmits directivity information of the microphone 20 to the emergency notification device 10. The emergency notification device 10 controls the directivity of the microphone 20 according to the directivity information as described above.

When a call is started, the operator calls the occupant of the vehicle 90 such as "Is it OK?". A voice of the operator is listened to at each seat. When there is a response indicating that there is no problem from the driver to which the microphone 20 is directed, the operator does not request an ambulance.

When there is no response to the call from the driver, the operator confirms the image 100 on the display unit 76, and designates the seating position of the occupant with a low degree of serious injury through, for example, a touch manipulation on the screen. The operator can rapidly ascertain the degree of serious injury and the seating position of each occupant by confirming the image. Accordingly, it becomes easy to start talking with an occupant with a low degree of serious injury who is more highly likely to be able to talk than an occupant with a high degree of serious injury. In the example of FIG. 3, it is assumed that the operator designates the right rear seat.

When the operator can talk with a designated occupant, the operator listens to a degree of injury of each occupant and requests an ambulance. Since the microphone 20 has high sensitivity in a direction of the designated occupant and low sensitivity in the other directions, it is easy to clearly acquire the voice of the designated occupant even in a situation in which noise outside the vehicle is large.

The operator also requests the ambulance even when there is no response from all occupants. When the operator requests the ambulance, the operator sends a notification to a communication control room of a fire department headquarter, informs of the position of the vehicle 90 and the information for specifying the vehicle 90 based on the received emergency notification information, and informs of a degree of injury when the operator can listen to the degree of injury from the occupant. The information processing device 40 may transmit the emergency notification information to a terminal device such as the communication command room of the fire department.

The operator may designate the position of the window in an open state in the image when there is no response from all the occupants. The operator can rapidly ascertain the window in an open state by confirming the image. Since the directivity of the microphone 20 is controlled in a direction of the designated open window and the operator can listen to the sound outside the vehicle collected by the microphone 20, a range of measures, for example, is widened as will be shown below.

For example, even when it is difficult to specify a road on which an accident has occurred from a position of the vehicle 90 in the emergency notification information due to an expressway or a highway and general roads being vertically in parallel, the road on which the accident has occurred is likely to be rapidly specified. When travel sound of another vehicle is heard from the outside of the vehicle and a voice of a passerby is not heard, an accident is likely to have occurred on an expressway or a highway. When the voice of the passerby from the outside of the vehicle is heard, an accident is likely to have occurred on a general road. The operator can talk to a passerby outside the vehicle to confirm when a road is a general road. When the operator talks to a passerby outside the vehicle, the information processing device 40 may transmit an instruction to increase a volume of the speaker 22 to the emergency notification device 10 according to the manipulation input of the operator.

Further, the operator can talk with a passerby outside the vehicle to request the passerby to perform an emergency measure of the occupant or listen to a more detailed accident situation or the like from the passerby. Since the microphone 20 has high sensitivity in the direction of the designated window in an open state and low sensitivity in the other directions, it is easy to clearly acquire a voice of the passerby.

Although configurations of the detection unit 50, acquisition unit 52, the derivation unit 54, the directivity controller 60, the call unit 62, the acquisition unit 72, the display controller 74, the call unit 78, the reception unit 80, and the determination unit 82 can be realized by hardware such as a CPU, a memory, or another LSI of any computer and can be realized by software such as a program loaded into the memory, functional blocks realized by cooperation of these are depicted. Therefore, it is understood by those skilled in the art that these functional blocks can be realized in various forms by solely hardware, solely software, or a combination thereof.

According to the embodiment, since the directivity of the microphone 20 in the vehicle cabin of the vehicle 90 causing the accident is determined based on a manipulation input of the operator, it can be easy to clearly acquire the voice of the passenger in the designated position. Thus, it is possible to allow the operator to rapidly take an appropriate action with respect to the accident.

The present disclosure has been described above based on the embodiment. The embodiment is merely an example, and it is understood by those skilled in the art that various modification examples can be made with respect to a combination of respective components or respective processes, and such modification examples are also within the scope of the present disclosure.

For example, in the case of the vehicle 90 in which the occupant detection sensor 12 and the seat belt sensor 14 are not provided at the rear seat, the presence or absence of opening and closing of the door on the rear seat may be detected by a door opening and closing sensor (not illustrated), and when the door is opened and subsequently closed before travel of the vehicle 90 starts, the acquisition unit 52 of the emergency notification device 10 may acquire that the occupant is seated on the seat corresponding to the door. Further, when the occupant detection sensor 12 and the seat belt sensor 14 are not provided at the rear seat, the directivity of the microphone 20 may be regularly directed to a direction of the rear seat during travel of the vehicle 90, and the acquisition unit 52 may estimate a seating position of the occupant at the rear seat based on a frequency of a sound collected by the microphone 20 and the direction of the directivity when the sound is collected. In these modification examples, in the vehicle 90 in which the occupant detection sensor 12 and the seat belt sensor 14 are not provided at the rear seat, it is possible to cause the operator to ascertain the presence or absence of the occupant at the rear seat or the seating position.

Although one microphone 20 is provided in the vehicle 90 in the embodiment, a first microphone of which the directivity can be controlled with respect to the occupant at the driver's seat, the occupant at the passenger seat, and the window, and a second microphone of which the directivity can be controlled with respect to the occupant at the rear seat and the window can be provided. In this modification example, a degree of freedom of the configuration of the vehicle 90 can be improved.

The emergency notification device 10 may hold driver information input in advance. The driver information includes, for example, information likely to be effective for lifesaving treatment, such as an age group, a blood type, and a sex. When the occurrence of an accident is detected, the derivation unit 54 also includes the driver information in the emergency notification information. In this modification example, for example, even when the driver is not conscious, the operator can inform emergency personnel before a movement of the driver information, and it becomes easy for the emergency personnel to prepare for a movement.

The derivation unit 54 of the emergency notification device 10 may also include, in the emergency notification information, information on an acceleration at the time of occurrence of an accident detected by an acceleration sensor (not illustrated). The acquisition unit 72 of the information processing device 40 may increase the degree of serious injury when an absolute value of the acceleration is greater for the occupant on the seat in which the seat belt is not worn. That is, the degree of serious injury may have steps more than two steps including high and low. In the modification example, it is possible to increase the amount of information to be provided to the operator.

When rollover of the vehicle 90 is detected by a gyro sensor (not illustrated) or the like, the derivation unit 54 of the emergency notification device 10 may also include rollover information in the emergency notification information. In the modification example, it is possible to increase the amount of information to be provided to the operator.

What is claimed is:

1. An information processing device comprising:
an acquisition unit configured to acquire information on a position of an occupant from a vehicle that is in an accident;
a reception unit configured to receive a manipulation input from an operator external to the vehicle; and
a determination unit configured to determine directivity of a microphone in a vehicle cabin of the vehicle based on the manipulation input, wherein,
the information processing device includes a display unit that displays an image representing a seating position of the occupant and a state of the occupant based on the information on the occupant,
the acquisition unit acquires information on an open and closed state of a window from the vehicle,
the display unit displays an image representing the open and closed state of the window, and
the determination unit determines the directivity of the microphone to be a direction of a designated window of the occupant in the accident based on the manipulation input for designating the window in the image displayed on the display unit.

2. An information processing device comprising:
an acquisition unit configured to acquire information on an occupant from a vehicle that is in an accident;
a display unit configured to display an image representing a seating position of the occupant and a state of the occupant based on the information on the occupant and a determination unit configured to determine directivity of a microphone in a vehicle cabin of the vehicle based on a manipulation input, wherein
the acquisition unit acquires information on an open and closed state of a window from the vehicle,
the display unit displays an image representing the open and closed state of the window, and
the determination unit determines the directivity of the microphone to be a direction of a designated window of the occupant in the accident based on the manipulation input for designating the window in the image displayed on the display unit.

3. An information processing method comprising:
an acquisition step of acquiring information on a position of an occupant from a vehicle that is in an accident and of acquiring information on an open and closed state of a window from the vehicle;
a reception step of receiving a manipulation input from an operator external to the vehicle;
displaying on a display unit an image representing the open and closed state of the window; and
a determination step of determining directivity of a microphone in a vehicle cabin of the vehicle based on the manipulation input received in the reception step, the directivity of the microphone being a direction of a designated window of the occupant in the accident based on the manipulation input for designating the window in the image displayed on the display unit.

* * * * *